(12) United States Patent
Tadoa et al.

(10) Patent No.: US 7,111,510 B2
(45) Date of Patent: Sep. 26, 2006

(54) LIQUID LEVEL DETECTION DEVICE

(75) Inventors: Nakagawa Tadoa, Niigata (JP); Sato Tetsuya, Niigata (JP)

(73) Assignee: Nippon Seiki Co., Ltd., Niigata (JP)

( * ) Notice: Subject to any disclaimer, the term of this patent is extended or adjusted under 35 U.S.C. 154(b) by 0 days.

(21) Appl. No.: 10/533,900

(22) PCT Filed: Nov. 18, 2003

(86) PCT No.: PCT/JP03/14687

§ 371 (c)(1),
(2), (4) Date: May 5, 2005

(87) PCT Pub. No.: WO2004/051199

PCT Pub. Date: Jun. 17, 2004

(65) Prior Publication Data

US 2006/0042377 A1    Mar. 2, 2006

(30) Foreign Application Priority Data

Nov. 29, 2002  (JP) .............................. 2002-347878

(51) Int. Cl.
*G01F 23/24* (2006.01)

(52) U.S. Cl. ........................ 73/304 R; 73/317; 73/305; 73/290 R; 73/313; 73/314; 340/620; 340/623; 340/624

(58) Field of Classification Search .................. 73/313, 73/314, 317, 290 R, 308, 304 R
See application file for complete search history.

(56) References Cited

U.S. PATENT DOCUMENTS 2,767,264 A * 10/1956 Scott, Jr. .................. 200/48 A
6,571,627 B1 * 6/2003 Yasuda et al. ................. 73/317
6,972,685 B1 * 12/2005 Sato et al. .................. 340/620

FOREIGN PATENT DOCUMENTS

| JP | 59-160718 | 9/1984 |
| JP | 60-39201 | 3/1985 |
| JP | 8-50045 | 2/1996 |

* cited by examiner

*Primary Examiner*—Hezron Williams
*Assistant Examiner*—Samir Shah
(74) *Attorney, Agent, or Firm*—McDermott Will & Emery LLP

(57) ABSTRACT

A liquid level detecting apparatus having detachable terminals and capable of holding down the formation of silver sulfide is provided. The apparatus includes a movable contact displaced in accordance with the fluctuation of a liquid level, electrodes slidingly contacted by the movable contact on a circuit board, a first resistance connected to the electrodes, and connecting portions which the terminals contact, a resistance value of the first resistance which varies when the movable contact is slidingly moved on the electrodes being outputted from the terminals via the connecting portions, wherein the sections of the connecting portions which contact at least the terminals are covered with second resistances.

3 Claims, 2 Drawing Sheets

LIQUID LEVEL DETECTION DEVICE

TECHNICAL FIELD

This invention relates to a liquid level detecting apparatus, and more particularly to a liquid level detecting apparatus capable of exchanging parts thereof.

BACKGROUND ART

The related art liquid level detecting apparatuses include a liquid level detecting apparatus in which a connecting portion (land) of a wiring board and terminals are connected together by using solder (refer to, for example, JP 60-39201 U, FIG. 1 and FIG. 2).

When trouble occurs in a terminal contacting the connecting portion and a lead wire connected to this terminal in the related art liquid level detecting apparatus, the exchanging of the terminal and lead wire only cannot be done even though the terminal and lead wire only are out of order. Moreover, since the terminal is connected to the connecting portion of the wiring board, the liquid level detecting apparatus is exchanged.

In recent years, a liquid level detecting apparatus forms a unit with a fuel pump, and this unit is provided in a fuel tank. This unitized structure necessarily accompanies the exchanging of the unitized liquid level detecting apparatus.

When the connecting portions, which are made of a material containing silver, and terminals are connected together without using solder, the silver reacts with the sulfur in a fuel to form silver sulfide. When the silver sulfide occurs between the connecting portions and terminals, the contact resistance becomes high due to the silver sulfide, and there was the possibility that the increased contact resistance caused an erroneous display on a meter.

Under the circumstances, the present invention aims at providing a liquid level detecting apparatus having detachable terminals and rarely influenced by the silver sulfide.

DISCLOSURE OF THE INVENTION

To achieve this object, the present invention provides a liquid level detecting apparatus having a movable contact displaced in accordance with the fluctuation of a liquid level, a slide on a circuit board on which slide the movable contact is slidingly moved, a resistance connected to this slide, and a connecting portions which terminals contact, a resistance value of the resistance which varies when the movable contact is slidingly moved on the slide being outputted from the terminals via the connecting portions, wherein at least the sections of the connecting portions which contact the terminals are covered with a second resistance.

The invention also provides the same liquid level detecting apparatus as described above, wherein a resistance value of the second resistance is set lower than that of the previously-mentioned resistance.

The invention further provides the same liquid level detecting apparatus as described above, wherein the second resistance contains at least ruthenium oxide ($RuO_2$) and has a sheet resistivity of not higher than 1.0 $\Omega/mm^2$.

BEST MODE FOR CARRYING OUT THE INVENTION

Figure 1:
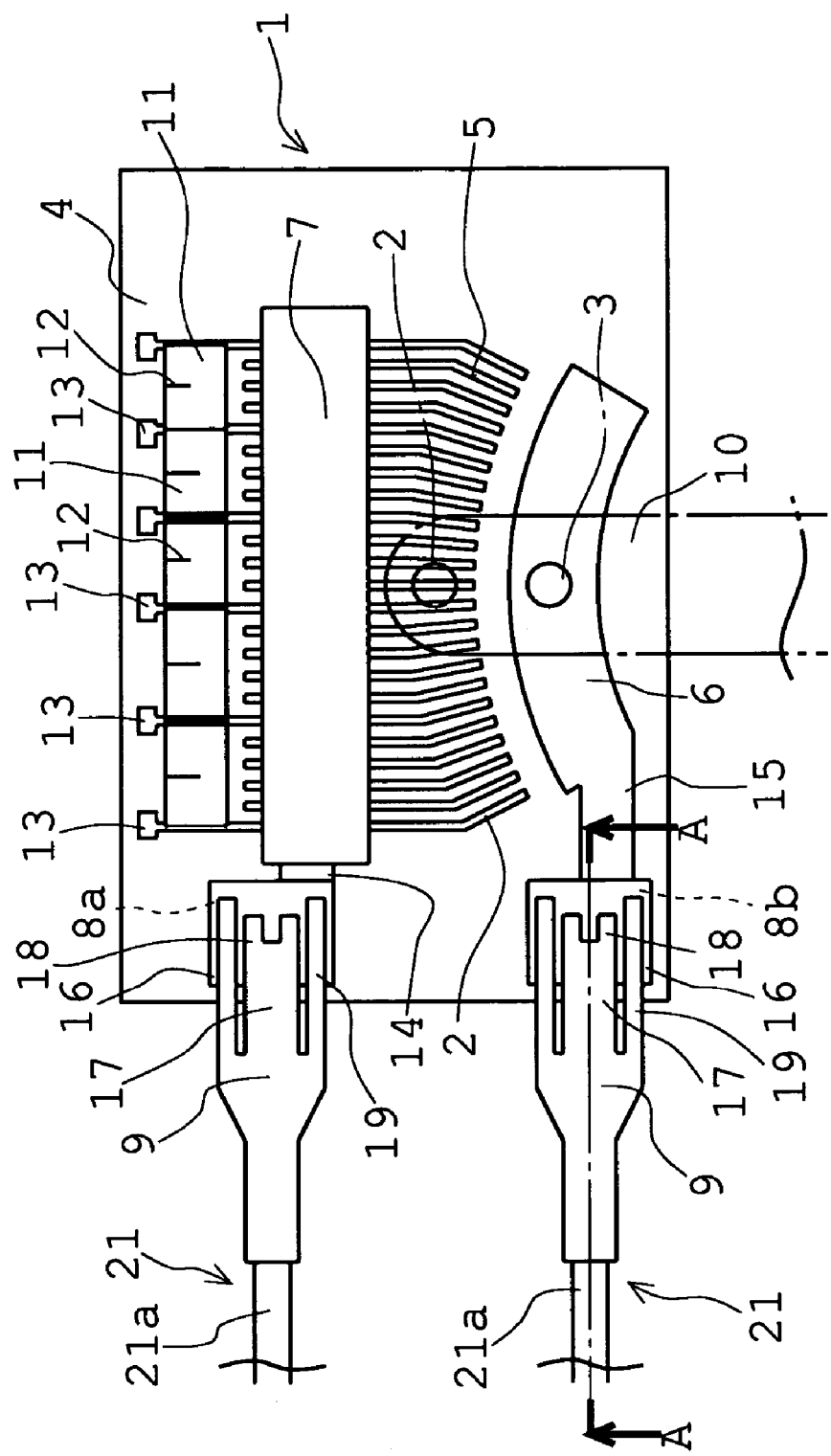
FIG. 1 is a front view of an embodiment of the present invention.
Figure 2:
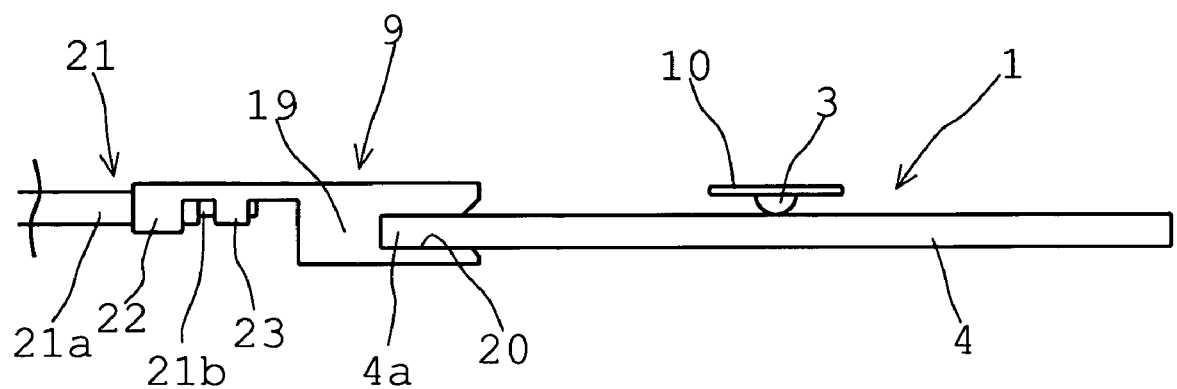
FIG. 2 is a side view of the same embodiment.

A liquid level detecting apparatus 1 of the present invention has a movable contact 2 to be displaced in accordance with the fluctuation of a liquid level, fixed electrodes 5 slidingly contacted by the movable contact 2, a first resistance 7 connected to the fixed electrodes 5, and connecting portions 8a, 8b which terminals 9 contact, respectively, a resistance value of the first resistance 7 which varies when the movable contact 2 is slidingly moved on the fixed electrodes 5 being outputted from the terminals 9 via the connecting portions 8a, 8b wherein at least the sections of the connecting portions 8a, 8b which contact the terminals 9 are covered with a second resistances 16, respectively. Owing to such construction, the liquid level detecting apparatus 1 in which the terminals 9 are detachable and rarely influenced by silver sulfide can be provided.

Another liquid level detecting apparatus according to the invention is formed so that the resistance value of the second resistances 16 are set lower than that of the first resistance 7. Owing to this structure, the liquid level detecting apparatus 1 in which the terminals 9 are detachable and rarely influenced by silver sulfide can be provided.

Still another liquid level detecting apparatus according to the invention is formed so that the second resistances 16 contain at least ruthenium oxide ($RuO_2$) and has a sheet resistivity of not higher than 1.0 $\Omega/mm^2$. Owing to such a structure, the liquid level detecting apparatus 1 in which the terminals 9 are detachable and rarely influenced by silver sulfide can be provided. Since the resistance value is set low, the tolerance of resistance value occurring when the second resistances are formed can be minimized, and in its turn a detection error can be reduced to a low level.

An embodiment of the present invention will be described with reference to the attached drawings. This embodiment will be described on the basis of a case where the present invention is applied to a liquid level detecting apparatus provided in a fuel tank of a vehicle, such as an automobile.

A liquid level detecting apparatus 1 includes first and second movable contacts 2, 3 to be displaced in accordance with the fluctuation of a liquid level (not shown), fixed electrodes 5 and fixed electrode 6 on which the first and second movable contacts 2, 3 provided on a circuit board 4 are slidingly moved, respectively, a first resistance 7 connected to the fixed electrodes 5 provided also on the circuit board 4, and connecting portions 8a, 8b also provided on the circuit board 4. Terminals 9 are in contact with these connecting portions 8a, 8b, respectively.

In the liquid level detecting apparatus 1, the first movable contact 2 is slidingly moved on the fixed electrodes 5 to cause the resistance value of the first resistance 7 to vary, and outputs this resistance value from the terminals 9 via the connecting portions 8a, 8b to meters and the like (not shown).

The first and second movable contacts 2, 3 are made of a conductive metal, such as german silver. These first and second movable contacts 2, 3 are fixed by calking to a plate type sliding member 10.

This sliding member 10 is a plate type body made of a conductive metal, and adapted to turn around a rotary shaft provided on a frame and the like (not shown) constituting the liquid level detecting apparatus 1. The sliding member 10 is operatively connected to a float (not shown) via a member, for example, an arm and the like (not shown). The float stays on a level of a liquid fuel stored in the fuel tank, and the sliding member 10 turns in accordance with the fluctuation of the liquid level. The first and second movable contacts 2, 3 are turned with the sliding member 10 around the above-mentioned rotary shaft, and slidingly moved on the fixed electrodes 5 and fixed electrode 6, respectively.

The fixed electrodes 5 are formed by providing a plurality of linearly made fixed electrodes like teeth of a comb. In this embodiment, the fixed electrodes 5 are formed at the side of one end portion thereof substantially in the shape of a fan so that the fixed electrodes 5 are on a path along which the first movable contact 2 is slidingly moved. The fixed electrode 6 in this embodiment is fan-shaped so that the fixed electrode 6 is on a path along which the second movable contact 3 is slidingly moved.

The fixed electrodes 5 and fixed electrode 6 are formed out of the same conductive paste in the same step. The components of this conductive paste are 80 wt % of silver and palladium and 20 wt % of glass and oxide, such as bismuth oxide. When this conductive paste is provided on the circuit board 4 by screen printing and the like and baked at a suitable temperature, the fixed electrodes 5 and fixed electrode 6 are sintered. Glass and an oxide, such as bismuth oxide gather on the surface and its vicinity of the fixed electrodes 5 and fixed electrode 6 thus baked, and these electrodes have an excellent abrasion resistance. The fixed electrodes 5 and fixed electrode 6 having an excellent abrasion resistance can be obtained.

The first resistance 7 is formed out of a material containing ruthenium oxide, by providing a resistance paste on the circuit board 4 by screen printing and baking the resultant product at a suitable temperature. In this embodiment, the first resistance 7 is provided astride the plural linear fixed electrodes constituting the fixed electrodes 5. The shape of the first resistance 7 in this embodiment is rectangular. The shape of the first resistance 7 can be set arbitrarily taking a layout on the circuit board 4 into consideration.

Referring to FIG. 1, a reference numeral 11 denotes regulating resistances, which are formed in the same step as the first resistance 7. The regulating resistances 11 are connected to extensions of arbitrary fixed electrodes among the plural fixed electrodes forming the fixed electrodes 5, and provided in parallel with the first resistance 7. The resistance value of the first resistance 7 is regulated to an arbitrary characteristic value by changing the resistance values of the regulating resistances 11 by removed portions 12 obtained by removing parts of the regulating resistances 11 by laser trimming. Referring to FIG. 1, a reference numeral 13 denotes detecting lands which an inspection needle (not shown) of an apparatus for measuring the resistance value of the regulating resistance 11 contacts.

In this embodiment, two substantially square connecting portions 8a, 8b are formed. The thickness of the film of the connecting portions 8a, 8b is not smaller than 7.5 μm. The connecting portion 8a joined to the first resistance 7 is provided with a pattern 14 extending from the connecting portion 8a and joined to the first resistance 7. The connecting portion 8b joined to the fixed electrode 6 is provided with a pattern 15 extending from the connecting portion 8b and joined to the fixed electrode 6. The connecting portions 8a, 8b and extension patterns 14, 15 are also formed out of the same conductive paste as that of the mentioned fixed electrodes 5 and fixed electrode 6 in the same step.

The outer surfaces of the connecting portions 8a, 8b excluding the extension patterns 14, 15 are covered with second resistances 16. Therefore, the connecting portions 8a, 8b enable the formation of silver sulfide to be held down, and the influence of the silver sulfide to be rarely received. The material of which the second resistances 16 are made contains ruthenium oxide just as that of the first resistance 7.

In this embodiment, the resistance values of the second resistances 16 are lower than that of the first resistance 7. In this embodiment, the second resistances 16 contain at least ruthenium oxide ($RuO_2$), and have sheet resistivity of not higher than 1.0 $\Omega/mm^2$. When the resistance values of the second resistances 16 are thus set low, the fluctuation of the resistance values, i.e. the tolerance of the resistance values occurring due to the nonuniformity and the like of the second resistances 16 encountered in the formation thereof by printing can be minimized, thereby an influence on the resistance values to be outputted can be decreased and in its turn a detection error made by the liquid level detecting apparatus can be reduced to a low level.

The terminals 9 are formed by subjecting a conductive plate type metal to a process, such as a punching and bending. In this embodiment, the terminals are formed out of phosphor bronze, the outer surface of which is plated.

Figure 3:
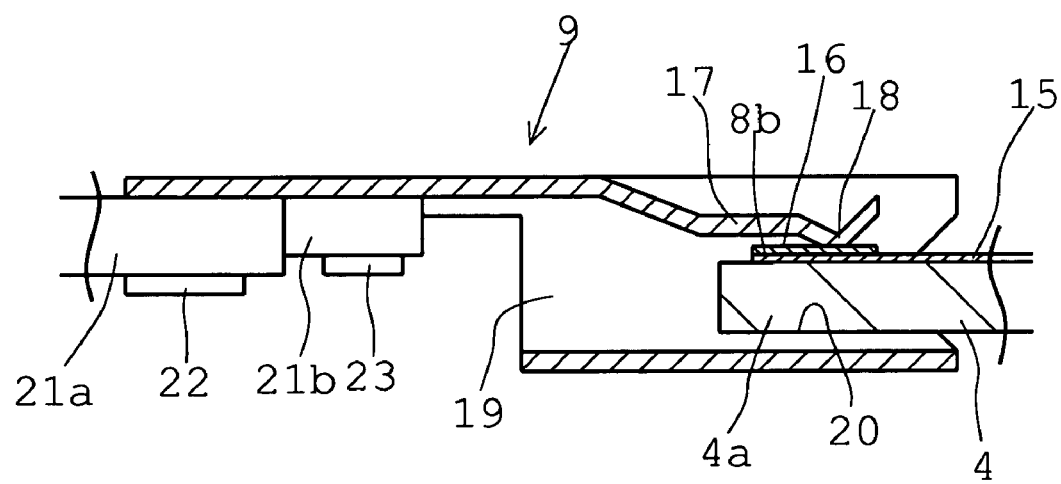
FIG. 3 is a sectional view taken along the line A—A in FIG. 1.

The terminals 9 are provided as shown in FIG. 1 and FIG. 3 with elastic contact pieces 17 contacting the connecting portions 8a, 8b of the circuit board 4. Since the connecting portions 8a, 8b are covered with second resistances 16, the contact pieces 17 contact the connecting portions 8a, 8b via the second resistances 16.

These contact pieces 17 are formed so as to be integral with the terminals 9, and provided at the portions thereof which are in the vicinity of the front ends thereof with bifurcated contact portions 18. Owing to the two bifurcated contact portions 18, the contact pieces 17 reliably come into contact with the connecting portions 8a, 8b.

The terminals 9 are provided in side surfaces 19 thereof with recesses 20 for retaining an end portion of the circuit board 4. The circuit board 4 is positioned by inserting the end portion 4a into the recesses, and the contact portions 18 are provided so that the contact portions are reliably connected to the circuit board 4.

The terminals 9 retain lead wires 21. The retaining of the lead wires 21 is done by retaining insulating films 21a of the lead wires 21 by first calked portions 22 of the terminals 9, and by retaining wires 21b which are covered with the insulating films 21a, and which are made of a conductive metal, by second calked portions 23.

Since the present invention is formed as described above, solder and the like is not used to join the connecting portions 8a, 8b to the terminals 9, so that the detaching of the terminals 9 can be done. Moreover, the sections of the connecting portions 8a, 8b which contact the terminals 9 are covered with the second resistances 16. This enables a liquid level detecting apparatus capable of holding down the occurrence of silver sulfide in the connecting portions 8a, 8b, and in its turn rarely receiving the influence of the silver sulfide to be provided.

In the above-described embodiment, the second resistances 16 cover the surfaces of the connecting portions 8a, 8b excluding the extension patterns 14, 15 but the present invention is not limited to the embodiment. The second resistances 16 may be formed so as to cover only the sections of the connecting portions that the contact portions 19 of the terminals 9 contact. When the apparatus is formed in this manner, the surface area of the second resistance 16 decreases, and in its turn the manufacturing cost can be reduced.

In the above-described embodiment, the sheet resistivity of the second resistances 16 is set to not higher than 1.0

Ω/mm². The sheet resistivity can be suitably set as long as the level thereof is not higher than 1.0 Ω/mm².

INDUSTRIAL APPLICABILITY

The present invention can be applied to a liquid level detecting apparatus, and suitably in particular to a liquid level detecting apparatus having detachable terminals, and capable of holding down the formation of silver sulfide.

The invention claimed is:

1. A liquid level detecting apparatus having movable contacts to be displaced in accordance with the fluctuation of a liquid level, fixed electrodes slidingly contacted by the movable contact on a circuit board, a first resistance connected to the fixed electrodes, and connecting portions which terminals contact, a resistance value of the first resistance which varies when the movable contact is slidingly moved on the fixed electrodes being outputted from the terminals via the connecting portions, characterized in that at least the sections of the connecting portions which contact the terminals are covered with second resistances.

2. A liquid level detecting apparatus according to claim 1, characterized in that the resistance values of the second resistances are set lower than that of the first resistance.

3. A liquid level detecting apparatus according to claim 2, characterized in that the second resistances contain at least ruthenium oxide ($RuO_2$), and have a sheet resistivity of not higher than 1.0 Ω/mm².

* * * * *